United States Patent [19]
Akiwa et al.

[11] Patent Number: 5,972,453
[45] Date of Patent: Oct. 26, 1999

[54] REMOVABLE FILM FOR THE WINDOWS OF MOTOR VEHICLES

[75] Inventors: Jun Akiwa, Warabi; Toshiaki Tozuka, Urawa, both of Japan

[73] Assignee: Lintec Corporation, Tokyo, Japan

[21] Appl. No.: 08/921,577

[22] Filed: Sep. 2, 1997

[30] Foreign Application Priority Data

Sep. 3, 1996 [JP] Japan ................................. 8-250900

[51] Int. Cl.⁶ ........................... B32B 33/00; G09F 7/12

[52] U.S. Cl. .................... 428/40.1; 296/95.1; 296/96.19; 428/40.9; 428/41.1; 428/41.2; 428/41.6; 428/41.7; 428/203

[58] Field of Search .................. 428/40.1, 40.9, 428/41.1, 41.2, 41.6, 41.7, 203; 296/95.1, 96.19

[56] References Cited

U.S. PATENT DOCUMENTS

| | | | |
|---|---|---|---|
| 4,075,386 | 2/1978 | Willdorf | 428/41.6 |
| 4,090,464 | 5/1978 | Bishopp | 428/203 |
| 4,797,317 | 1/1989 | Oliver | 428/204 |

*Primary Examiner*—Nasser Ahmad
*Attorney, Agent, or Firm*—Levy & Grandinetti

[57] ABSTRACT

The present invention provides a removable window film for motor vehicles comprising a base film (1) and an adhesive layer (2) having removability and low adhesive strength and comprising a low adhesive strength type adhesive, wherein the adhesive layer (2) is formed on one surface of the base film. The removable window film for motor vehicles can be adhered to a glass window of a motor vehicle having a smooth surface, sufficiently held on the glass window after adhering, and easily peeled from the glass window of motor vehicles without damage to the window film or staining the glass window of the motor vehicle.

9 Claims, 1 Drawing Sheet

REMOVABLE FILM FOR THE WINDOWS OF MOTOR VEHICLES

BACKGROUND OF THE INVENTION

1. Field of the Invention

The present invention relates to a removable film for the windows of motor vehicles. The film can be adhered to a glass window having a smooth surface, sufficiently held on the glass window after being adhered thereto, and easily peeled therefrom without damaging the film or staining the glass window. If desired, the film can also reduce the transmittance of ultraviolet and/or visible light.

2. Description of Related Art

In recent years, the same films that have been used for fashion, design, and privacy have been used as window films for motor vehicles. These films comprise a base film having applied thereto the same pressure-sensitive adhesive that is used in films for building materials to prevent glass-splashing, and a silicone type polyester release film that is adhered to the pressure-sensitive adhesive layer.

Difficulties arise, however, in using the strong pressure-sensitive adhesives of the prior art to adhere films to the windows of motor vehicles. For example, there are many failings attributed to the adhesion of the surfaces of the pressure-sensitive adhesive layers to each other during the process of adhering the films to the windows. Further, because the window films are adhered with the strong pressure-sensitive adhesives, it is difficult to remove them from the windows once they have been adhered without damaging the film and/or leaving residues of the adhesives on the window. Thinners or solvents have been used to remove such residues, but this procedure carries with it the danger of damaging polyurethane or polyvinyl chloride leathers used as interior materials for the motor vehicles.

SUMMARY OF THE INVENTION

One object of the present invention is to provide removable window films for motor vehicles that can be separated and used even if their pressure-sensitive adhesive layers become adhered to each other prior to their application to the motor vehicle windows.

Another object of the present invention is to provide removable window films that can be easily adhered to motor vehicle windows, can maintain sufficient adhesion to the windows for practical use after being adhered thereto, and can be easily peeled therefrom without being damaged or staining the glass windows.

Still another object of the present invention is to provide a method for easily adhering a window film to motor vehicle windows.

Extensive investigations undertaken by the present inventors directed to the objects described above have led to the discovery that such objects can be achieved by the formation of a window film having an adhesive layer comprising a low adhesive strength type adhesive on one surface of a base film.

The present invention is directed to a removable window film for motor vehicles comprising a base film and a removable adhesive layer having low adhesive strength formed on one surface of the base film, said adhesive layer comprising an adhesive having a low adhesive strength.

In another aspect, the present invention is directed to a removable window film for motor vehicles, as described above, further comprising a vapor deposited metal layer between the base film and the adhesive layer.

In still another aspect, the present invention is directed to a removable window film for motor vehicles, as described above, wherein the adhesive further comprises a colorant.

In yet another aspect, the present invention is directed to a removable window film for motor vehicles, as described above, wherein the adhesive further comprises an ultraviolet absorbent.

Further, the present invention is directed to a method for attaching a film to a motor vehicle window which comprises adhering a removable window film of the type described above to said window.

DESCRIPTION OF PREFERRED EMBODIMENTS

Figure 1:
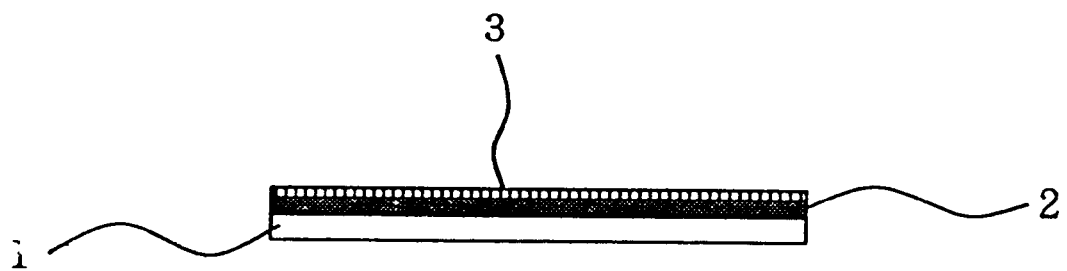
FIG. 1 shows a sectional view of one embodiment of the removable window film for motor vehicles of the present invention.

As described above, the adhesive layer of the window films of the present invention comprises an adhesive having a low adhesive strength.

The adhesive having a low adhesive strength can comprise, for example, a polyurethane. Such a polyurethane type adhesive having a low adhesive strength can comprise, for example, a polyurethane elastomer comprising (1) a soft segment comprising a long chain polyol as a main component and (2) a hard segment comprising a diisocyanate compound and a chain extension agent.

It is preferred that the long chain polyol be a polyester polyol or a polyether polyol.

The diisocyanate compound can, for example, be tolylene diisocyanate (TDI), diphenylmethane diisocyanate (pure MDI), hexamethylene diisocyanate (HDI), or the like.

The chain extension agent can, for example, be a low molecular weight polyol, an aromatic diamine, or the like.

Polyurethane elastomers include, for example,:

(1) one-component types, wherein a thermoplastic polyurethane elastomer, produced by polymerizing a long chain polyol and a diisocyanate, such as, TDI, MDI, and the like, is diluted with an organic solvent; and (2) two-component types, wherein a curing reaction is carried out by adding a crosslinking agent, such as, a polyisocyanate, to a polyurethane elastomer or a prepolymer thereof. Preferably, a crosslinking accelerator is also added.

The two-component type polyurethane elastomers are preferable. Preferably, where a polyisocyanate is used as the crosslinking agent, it will be an aliphatic or alicyclic polyisocyanate, as this will result in improved weathering resistance.

Further, the polyurethane elastomer can be of the moisture-curing type, wherein an isocyanate is reacted with moisture in air, or of the thermomelting extrusion type, i.e., hot melt.

In addition, other polyurethane adhesives having a low adhesive strength can include, for example, a polyurethane produced by reacting a prepolymer—having an end isocyanate group and produced by reacting a mixture of one or more polyols having an average functional group number of 2 to 2.6 with an excess of organic diisocyanate—with a mixture of one or more polyols having an average functional group number of 2 or more in an equivalent ratio of NCO to OH of about 0.65 to about 1.15; wherein the total of the average functional group number of the polyol mixture and the average functional group number of the polyol mixture as the prepolymer component is more than 4 and less than 5.

In the polyurethane, the polyols of the polyol mixture can include: propylene glycol, ethylene glycol, polymers produced by the addition polymerization of propylene oxide and/or ethylene oxide to propylene glycol or ethylene glycol; polyether diols, such as, polytetramethylene ether glycol; polyester glycols produced by the dehydration condensation of low molecular weight glycols, such as, ethylene glycol, propylene glycol, and 1,4-butane diol, and organic acids, such as, adipic acid and phthalic acid; glycerol, trimethylol propane, pentaerythritol, arabitol, sorbitol, and polymers produced by the addition polymerization of propylene oxide and/or ethylene oxide to one or more of these as an initial agent. It is also possible to use polymer polyols produced by polymerizing vinyl monomers, such as, acrylonitrile and styrene, in the polyols described above.

In the polyurethane, the organic diisocyanates include: aromatic diisocyanates, such as, 2,4-tolylenediisocyanate, 2,6-tolylenediisocyanate, and mixtures thereof, crude tolylenediisocyanate, 4,4'-diphenylmethanediisocyanate, 2,4'-diphenylmethanediisocyanate, polymethylenepolyphenyl polyisocyanate, and 1,5-naphthylenediisocyanate; aliphatic or alicyclic diisocyanates, such as, hexamethylenediisocyanate, lysinediisocyanate, isophoronediisocyanate, 4,4'-dicyclohexylmethanediisocyanate, isopropylidene bis (cyclohexylisocyanate), and xylidenediisocyanate; and dimers, trimers, and carbodiimide modified compounds thereof. Among the organic diisocyanates, the aliphatic and alicyclic diisocyanates are preferred, in view of their weathering resistance.

Still other polyurethane adhesives having a low adhesive strength include a polyurethane comprising a polyisocyanate compound and a low molecular weight olefin type polyol that has no polar groups in its molecular skeleton, and has end hydroxyl groups, a number average molecular weight of from about 500 to about 5,000, and from about 1.5 to about 8 hydroxyl groups per molecule. The polyisocyanate compounds that can be used are as described above.

The polyurethane adhesives employed in the practice of the present invention can be used alone or in combination of two or more.

As used in the present invention, the term "low adhesive strength" preferably means a peel strength of from about 1 g/25 mm to about 50 g/25 mm.

Conventional colorants, such as dyes and pigments, can be incorporated in the above-described adhesives. Examples of such colorants include: organic pigments or dyes, such as, phthalocyanine type, azo type, condensed azo type, azo lake type, Hansa type, benzimidazolone type, anthraquinone type, diallylide type, perylene type, perynone type, indigo type, thioindigo type, isoindolinone type, azomethineazo type, dioxazine type, quinacridone type, aniline black type, triphenylmethane type, carbon black type, methine type, quinophthalone type, and anthrapyridone type pigments or dyes; and inorganic pigments, such as oxides, sulfides, or sulfates of zinc, lead, titanium, antimony, cadmium, iron, arsenic, magnesium, aluminum, cobalt, or chromium, and metal powders. Examples of the inorganic pigments are titanium oxide type, iron oxide type, iron hydroxide type, chromium oxide type, spinel baked type, chromic acid type, chromium vermilion type, Prussian blue type, aluminum powder type, and bronze powder type pigments.

When vivid color tone or high transparency is specifically required, dyes or pigments of the anthraquinone type, indigo type, and diazo type are preferably used. When weathering resistance is required, oxides, sulfides, or sulfates of zinc, lead, titanium, antimony, cadmium, iron, arsenic, magnesium, aluminum, cobalt, chromium, or the like are used.

Colorants that can transmit only arbitrary color are preferred, and colorants that can transmit only blue, brown, or gold are especially preferred.

A suitable amount of the colorant will be dependent upon the coloration degree required in a given case, and can readily be selected accordingly by those skilled in the art.

An ultraviolet absorbing agent can be incorporated in the above-described adhesives. Such agents include, for example, benzophenone ultraviolet absorbing agents, such as, 2-hydroxy-4-methoxybenzophenone, 2-hydroxy-4-octoxybenzophenone, 2,2'-dihydroxy-4-methoxybenzophenone, 2,4-dihydroxybenzophenone, 2-hydroxy-4-dodecyloxybenzophenone, 2,2'-dihydroxy-4,4'-dimethoxybenzophenone, 2-hydroxy-4-methoxy-5-sulfobenzophenone, and bis(2-methoxy-4-hydroxy-5-benzoylphenyl)methane; salicylic acid ultraviolet absorbing agents, such as, phenylsalicylate, p-tert-butylphenylsalicylate, and p-octylphenylsalicylate; benzotriazole ultraviolet absorbing agents, such as 2-(2'-hydroxy-5'-methylphenyl)benzotriazole, 2-(2'-hydroxy-5'-tert-butylphenyl)benzotriazole, 2-(2'-hydroxy-3',5'-di-tert-butylphenyl)benzotriazole, 2-(2-hydroxy-3-tert-butyl-5'-methylphenyl)-5-chlorobenzotriazole, 2-(2'-hydroxy-3',5'-di-tert-butylphenyl)-5-chlorobenzotriazole, 2-(2'-hydroxy-3',5'-di-tert-amylphenyl)benzotriazole, 2-{2'hydroxy-3'-(3", 4",5",6"-tetrahydrophthalimidomethyl)-5'-methylphenyl}benzotriazole, and 2,2-methylenebis{4-(1,1, 3,3-tetramethylbutyl)-6-(2H-benzotriazole-2-il)phenol}; cyanoacrylate ultraviolet absorbing agents, such as 2-ethylhexyl-2-cyano-3,3'-diphenylacrylate, and ethyl-2-cyano-3,3'-diphenylacrylate.

The amount of the ultraviolet absorbing agent is preferably in a range between about 0.2 and about 5 parts by weight based on 100 parts by weight of the adhesive having a low adhesive strength.

The thickness of the adhesive layer is not critical, but is normally in a range of from about 5 to about 100 micrometers, preferably in a range of from about 10 to about 50 micrometers.

In the films of the present invention, a vapor deposited metal layer can be provided between the base film and the adhesive layer. Examples of metals that can be used in such layers include aluminum, gold, silver, copper, nickel, cobalt, chromium, tin, and indium, of which aluminum, gold, silver, and tin are more preferred, and aluminum is most preferred.

The thickness of the vapor deposited metal layer is preferably in a range of from about 50 to about 300 angstroms.

Examples of base films that can be employed in the practice of the present invention, which are preferably transparent, include films or laminated films of various resins, including polyolefin resins, such as, polyethylene and polypropylene, vinyl chloride resins, styrene resins, acrylonitrile-butadiene-styrene resins, polyvinyl alcohol resins, acrylic resins, acrylonitrile-styrene resins, vinylidene chloride resins, acrylonitrile acrylic styrene resins, acrylonitrile ethylene-propylene-terpolymer styrene resins, polyurethane resins, polyvinyl butyral resins, poly-4-methylpentene-1 resins, polybutene-1 resins, poly (vinylidene fluoride) resins, polyvinyl fluoride resins, fluorine-containing resins, polycarbonate resins, polyamide resins, polyacetal resins, polyphenylene oxide resins, polyester resins, such as, polybutylene terephthalate and polyethylene terephthalate, polyphenylene sulfide resins, polyimide resins, polysulfone resins, polyether sulfone resins, aromatic polyester resins, and polyallylate resins. Among these films, polyester resin films, vinyl chloride resin films, and polyolefin resin films are preferred, and polyester resin films are most preferred. The base films can be uniaxially or biaxially oriented.

A suitable thickness of the base film can readily be selected by those skilled in the art, and normally is in a range of from about 5 to about 200 micrometers, preferably in a range of from about 10 to about 100 micrometers.

In the films of the present invention, a release film layer can also be provided for protecting the surface of the adhesive layer. This layer is preferably transparent and is preferably a non-silicone type of polyester release film.

The adhesive layer can be applied to the base film by various methods, including, for example, a method in which it is dissolved in a suitable solvent and applied to the base film; a method in which it is applied to the base film by hot melt extrusion; a method in which it is dispersed or emulsified in a suitable medium and applied to the base film; a method in which, without using solvent, it is applied to the base film; a method in which it is applied by casting or with calender rolls or knives; a method in which an adhesive layer formed on a release liner is transferred to the base film; and a method in which a double-sided adhesive tape is applied with a normal adhesive and the low adhesive strength type adhesive on each side is overlaid on the base film to contact the normal adhesive and the base film.

If the anchoring force between the base film and the adhesive layer is insufficient, the surface of the base film can be treated with corona discharge or, preferably, a primer layer can be applied thereto. Such a primer layer preferably comprises a polyester resin, a urethane resin, or a chlorinated polyolefin resin and can contain a filler, as required. Various fillers can be used for this purpose, including silica, calcium carbonate, magnesium carbonate, kaolin, sintered clay, bentonite, zeolite, talc, and diatomaceous earth.

Owing to the use of the removable, low adhesive strength type adhesive in the removable window films for motor vehicles of the present invention, the window films can be adhered to a glass window having a smooth surface, sufficiently held on the glass window after being adhered thereto, and then easily peeled from the glass window without damage to the window film or staining of the glass window.

Further, when a colorant or an ultraviolet absorbing agent is incorporated in the adhesive, the window films of the present invention can efficiently reduce transmittance of ultraviolet light and/or visible light, as required.

Furthermore, when a vapor deposited metal layer is provided between the base film and the adhesive layer in the window films of the present invention, the window films can reflect ultraviolet light and reduce visible light.

The present invention also provides an adhering method which comprises adhering the removable window films for motor vehicles of the present invention to a glass window of a motor vehicle. The preferred embodiments of the adhering method of the present invention can reduce transmittance of ultraviolet light and/or visible light.

EXAMPLE 1

FIG. 1 shows a sectional view of one embodiment of the removable window films for motor vehicles according to the present invention.

On one surface of a transparent base film 1 (a polyester resin film, having a thickness of 25 micrometers), a homogeneous mixture of 100 parts by weight of a polyether-type polyurethane elastomer (CRISVON™ NT-1635EL, DAINIPPON INK & CHEMICALS, INC., concentration: 65 percent by weight), 20 parts by weight of an aliphatic diisocyanate crosslinking agent (BARNOCK™ DN-950, DAINIPPON INK & CHEMICALS, INC., concentration: 75 percent by weight) and 3 parts by weight of a crosslinking accelerator (CRISVON™ AccelT, DAINIPPON INK & CHEMICALS, INC.) was applied by casting and heated at 100° C. for 12 minutes to form an adhesive layer 2 comprising a polyurethane elastomer having a thickness of 20 micrometers. Then, a transparent nonsilicone-type polyester release film 3 (thickness: 25 micrometers) was applied to the surface of the adhesive layer 2 to obtain a removable window film for motor vehicles.

EXAMPLE 2

A removable window film for motor vehicles was obtained by the same method as in Example 1, except that a homogeneous mixture of 100 parts by weight of a polyester-type polyurethane elastomer (CRISVON™ 5150S, DAINIPPON INK & CHEMICALS, INC., concentration: 50 percent by weight), 4 parts by weight of an aromatic diisocynate crosslinking agent (CRISVON™ NX, DAINIPPON INK & CHEMICALS, INC., concentration: 75 percent by weight), and 3 parts by weight of a crosslinking accelerator (CRISVON™ Accel HM, DAINIPPON INK & CHEMICALS, INC.) was used instead of the homogeneous mixture of Example 1.

EXAMPLE 3

A removable window film for motor vehicles was obtained by the same method as in Example 1, except that 10 parts by weight of a blue dye (NEO SUPER LIQUID™ Blue C531-L, a 1:2 type metal complex dye, CHUO GOSEI CHEMICAL CO.) based on 100 parts by weight of the polyurethane elastomer was mixed into the polyurethane elastomer of Example 1.

EXAMPLE 4

A removable window film for motor vehicles was obtained by the same method as in Example 2, except that 10 parts by weight of a blue dye (MICROLITH™ Blue KP, anthraquinone dye, NIPPON CIBA-GEIGY CO.) based on 100 parts by weight of the polyurethane elastomer was mixed into the polyurethane elastomer of Example 2.

EXAMPLE 5

A removable window film for motor vehicles was obtained by the same method as in Example 1, except that 1.5 parts by weight of a benzophenone-type ultraviolet absorbing agent, 2,4-dihydroxybenzophenone, (BIOSORB™ 100, KYODO CHEMICALS CO.) based on 100 parts by weight of the polyurethane elastomer was mixed into the polyurethane elastomer of Example 1.

EXAMPLE 6

A removable window film for motor vehicles was obtained by the same method as in Example 2, except that 1.5 parts by weight of a benzophenone-type ultraviolet absorbing agent, 2,4-dihydroxybenzophenone, (BIOSORB™ 100, KYODO CHEMICALS CO.) based on 100 parts by weight of the polyurethane elastomer was mixed into the polyurethane elastomer of Example 2.

EXAMPLE 7

Figure 2:
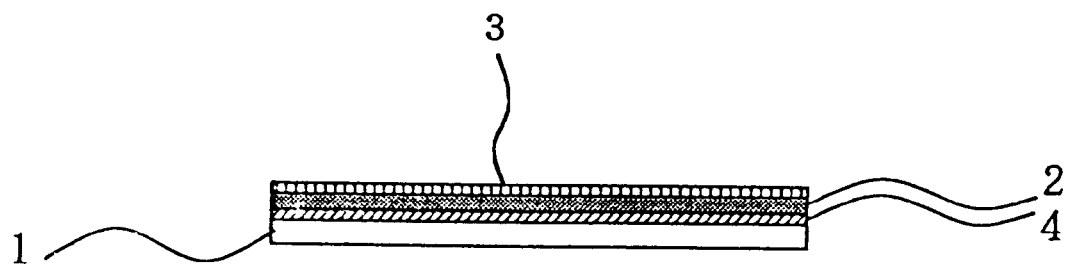
FIG. 2 shows a sectional view of another embodiment of the removable window film for motor vehicles of the present invention.

As shown in FIG. 2, a metal vapor deposited layer 4 (an aluminum vapor deposited layer having a thickness of 100 angstroms) was formed by the vapor deposition of aluminum on one surface of a transparent base film 1 (a polyester resin film, having a thickness of 25 micrometers). A polyurethane elastomer (CRISVON™ 5516S, DAINIPPON INK & CHEMICALS, INC., concentration: 30 percent by weight) was applied on the surface of the metal vapor deposited layer 4 by casting and heated at 100° C. for 12 minutes to form an adhesive layer 2 comprising a polyurethane elastomer having a thickness of 20 micrometers. Then, a transparent nonsilicone-type polyester release film 3 (thickness: 25 micrometers) was provided on the surface of the adhesive layer 2 to obtain a removable window film for motor vehicles.

EXAMPLE 8

A removable window film for motor vehicles was obtained by the same method as in Example 7, except that a homogeneous mixture of 100 parts by weight of a polyester-type polyurethane elastomer (CRISVON™ 5150S, DAINIPPON INK & CHEMICALS, INC., concentration: 50 percent by weight), 4 parts by weight of an aromatic diisocyanate crosslinking agent (CRISVON™ NX, DAINIPPON INK & CHEMICALS, INC., concentration: 75 percent by weight) and 3 parts by weight of a crosslinking accelerator (CRISVON™ Accel HM DAINIPPON INK & CHEMICALS, INC.) was used instead of the polyurethane elastomer of Example 7.

The removable window films obtained in Examples 1 through 8 were adhered to a transparent glass window of a motor vehicle. The films were sufficiently held on the transparent glass window after adhering. Then, the removable window films were peeled from the transparent glass window of the motor vehicle. The films were easily peeled without damage. The glass window was not damaged and did not have a residue of the low adhesive strength type adhesive.

Test pieces prepared with the removable window films for motor vehicles obtained in Examples 1 through 8 were adhered to a transparent glass plate having a smooth surface. The peel strength, holding power, and ball tack of the test pieces were measured by the following methods.

1. Peel Strength

The peel strength was measured according to a peeling method at 180 degrees, which was provided in Japanese Industrial Standard Z 0237 (1991) 8.3.1.

2. Ball Tack

The ball tack was measured by using an inclined plate having an inclination of 30 degrees according to an incline ball tack test method at 180 degrees, which was provided in Japanese Industrial Standard Z 0237 (1991) 12.

3. Holding Power

The holding power was measured according to a holding power test method, which was provided in Japanese Industrial Standard Z 0237 (1991) 11.

The holding power relates to cohesive power or shear resistance. The longer the falling time, the larger is the shear resistance.

In each case, the test pieces of Examples 1 through 8 displayed a ball tack of less than 3 and a holding power (falling time) of more than 7000 seconds.

The peel strength results are shown in Table 1.

In measuring the holding power of Table 1, no dislocation of the test pieces of Examples 1 through 8 were observed.

TABLE 1

| Example | Peel Strength (g/25 mm) | |
| --- | --- | --- |
|  | After 30 min. Adhesion | After One Day Adhesion |
| 1 | 4 | 4 |
| 2 | 25 | 28 |
| 3 | 6 | 7 |
| 4 | 19 | 19 |
| 5 | 7 | 8 |
| 6 | 17 | 25 |
| 7 | 6 | 8 |
| 8 | 21 | 24 |

What is claimed is:

1. A removable window film for motor vehicles comprising a motor vehicle transparent flexible window base film and a removable adhesive layer having low adhesive strength formed on one surface of the base film, said adhesive layer comprising a polyurethane adhesive having a low adhesive strength.

2. The film of claim 1 further comprising a vapor deposited metal layer between the base film and the adhesive layer.

3. The film of claim 1 wherein a colorant is incorporated in the adhesive having a low adhesive strength.

4. The film of claim 1 wherein an ultraviolet absorbent is incorporated in the adhesive having a low adhesive strength.

5. The film of claim 1 wherein a transparent release film is adhered on a surface of the adhesive layer.

6. An adhering method which comprises adhering the removable window film for motor vehicles of claim 1 to a motor vehicle window.

7. An adhering method which comprises adhering the removable window film for motor vehicles of claim 2 to a motor vehicle window.

8. An adhering method which comprises adhering the removable window film for motor vehicles of claim 3 to a motor vehicle window.

9. An adhering method which comprises adhering the removable window film for motor vehicles of claim 4 to a motor vehicle window.

* * * * *